United States Patent
Gunning, III

[11] Patent Number: 5,926,241
[45] Date of Patent: Jul. 20, 1999

[54] PHOTO-PATTERNED COMPENSATOR WITH THIN FILM HAVING OPTICALLY BIREFRINGENT AND ISOTROPIC REGIONS AND METHOD OF MANUFACTURING FOR A LIQUID CRYSTAL DISPLAY

[75] Inventor: William J. Gunning, III, Newbury Park, Calif.

[73] Assignee: Rockwell International Corporation, Costa Mesa, Calif.

[21] Appl. No.: 08/804,875

[22] Filed: Feb. 24, 1997

[51] Int. Cl.⁶ .................................................. G02F 1/1335
[52] U.S. Cl. .......................................... 349/117; 349/119
[58] Field of Search ..................................... 349/117, 119

[56] References Cited

U.S. PATENT DOCUMENTS

| | | | |
|---|---|---|---|
| 4,701,028 | 10/1987 | Clerc et al. | 350/337 |
| 4,874,664 | 10/1989 | Hamaguchi et al. | 428/325 |
| 5,179,457 | 1/1993 | Hirataka et al. | 350/347 |
| 5,184,237 | 2/1993 | Iimura et al. | 359/63 |
| 5,193,020 | 3/1993 | Shiozaki et al. | 349/117 |
| 5,196,953 | 3/1993 | Yeh et al. | 359/73 |
| 5,241,408 | 8/1993 | Ishikawa et al. | 349/117 |
| 5,309,264 | 5/1994 | Lien et al. | 359/87 |
| 5,311,340 | 5/1994 | Murata et al. | 359/73 |
| 5,337,174 | 8/1994 | Wada et al. | 349/119 |
| 5,491,001 | 2/1996 | Mazaki et al. | 349/117 |
| 5,496,498 | 3/1996 | Toyooka et al. | 349/117 |
| 5,499,126 | 3/1996 | Abileah et al. | 349/117 |
| 5,504,603 | 4/1996 | Winker et al. | 349/117 |
| 5,548,426 | 8/1996 | Miyashita et al. | 349/117 |
| 5,557,434 | 9/1996 | Winker et al. | 349/117 |
| 5,578,243 | 11/1996 | Mazaki et al. | 349/117 |
| 5,612,801 | 3/1997 | Winker | 349/117 |

FOREIGN PATENT DOCUMENTS

| | | |
|---|---|---|
| 0 367 288 A2 | 5/1990 | European Pat. Off. . |
| 0 423 881 A1 | 4/1991 | European Pat. Off. . |
| 0 529 813 A2 | 3/1993 | European Pat. Off. . |
| 0 535 324 A1 | 4/1993 | European Pat. Off. . |
| 0 543 678 A1 | 5/1993 | European Pat. Off. . |
| 0 576 304 A1 | 12/1993 | European Pat. Off. . |
| 0 576 342 A1 | 12/1993 | European Pat. Off. . |
| 0 576 931 A3 | 1/1994 | European Pat. Off. . |
| 0 613 037 A2 | 8/1994 | European Pat. Off. . |
| 661 361 A5 | 7/1987 | Switzerland . |

OTHER PUBLICATIONS

Koike et al., "Late–News Paper: A Full–Color TFT–LCW With a Domain–Divided Twisted–Nematic Structure," SID 92 Digest, pp. 798–801, 1992.

Lien et al., "Multi–Domain Homeotropic Liquid Crystal Display for Active Matix Application," Proceedings 13th Int. Display Res. Conf.—Euro Display 93, Strasbourg—France, pp. 21–24, 1993.

Takatori et al., "A Complementary TN LCD with Wide–Viewing–Angle Grayscale," Proceedings 12th Int. Display Res. Conf.—Japan Display 92, pp. 591–594, 1992.

Yang, "Two–Domain Twisted Nematic and Tilted Homeotropic Liquid Crystal Displays for Active Matrix Applications," Record 1991 Int. Display Res. Conf., San Diego, CA, pp. 68–72, 1991.

*Primary Examiner*—Anita Pellman Gross
*Assistant Examiner*—Tarifur R. Chowdhury
*Attorney, Agent, or Firm*—James P. O'Shaughnessey; John J. Deinken

[57] ABSTRACT

A method to fabricate a photo-patterned organic compensator for liquid crystal displays, and the resulting compensator structure, are described. One illustrative fabrication method comprise: (1) depositing a thin film of polymerizable liquid crystal material onto one of a display's substrates; (2) orienting the liquid crystal material's director to a specified direction; (3) polymerizing the deposited thin film through an aperture mask; (4) removing the aperture mask; and (5) curing/annealing the thin film layer to yield a planar structure having substantially birefringent and isotropic regions. Complete pixelated compensators may be created by layering two or more such two-region thin films.

26 Claims, 6 Drawing Sheets

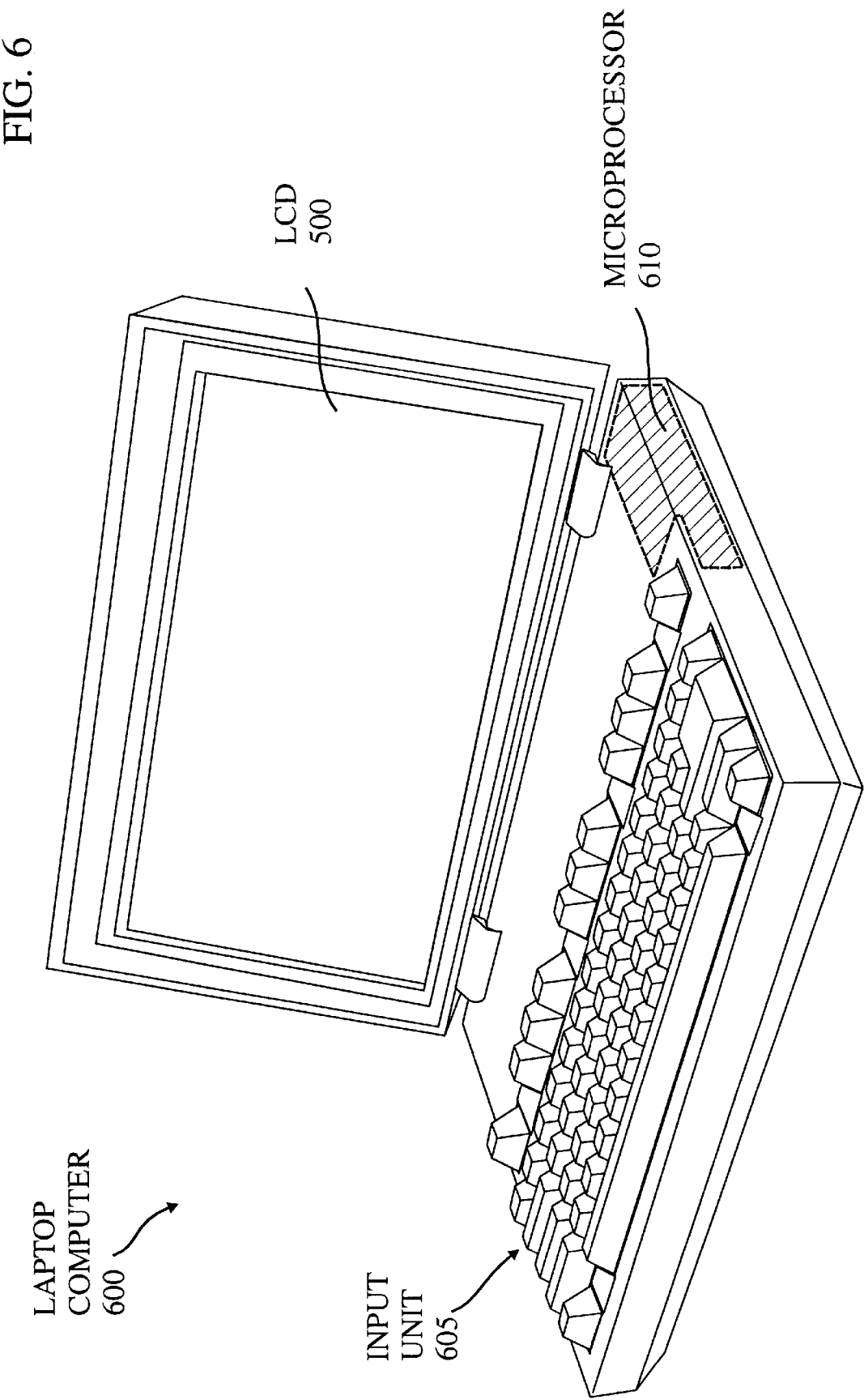

ically birefringent and isotropic regions and method of manufacturing for a liquid crystal display

PHOTO-PATTERNED COMPENSATOR WITH THIN FILM HAVING OPTICALLY BIREFRINGENT AND ISOTROPIC REGIONS AND METHOD OF MANUFACTURING FOR A LIQUID CRYSTAL DISPLAY

REFERENCES

Commonly owned U.S. Pat. Nos. 5,504,603 and 5,589,963 and co-pending patent application Ser. No. 313,531 entitled "Organic O-Plate Compensator for Improved Grayscale Performance in Twisted Nematic Liquid Crystal Displays," are hereby incorporated in their entirety by reference.

BACKGROUND OF THE INVENTION

The invention relates in general to the field of liquid crystal display design and, more particularly, to the fabrication of organic compensator elements for use in a liquid crystal display. Specifically, the invention describes a birefringent optical compensator that is comprised of sequentially layered surfaces having a plurality of photo-patterned regions wherein some of the regions in a layer are birefringent while other regions in the layer are substantially isotropic.

Contrast and stability of relative grayscale intensities are important attributes in determining the quality of a liquid crystal display (LCD). A primary factor limiting the contrast achievable in current LCDs is the amount of light which leaks through the display while it is in its dark state.

In addition, the contrast ratio of a LCD also depends on the viewing angle. Contrast ratios in a typical LCD are a maximum only within a narrow viewing angle centered about normal incidence and drops off as the viewing angle is increased. This loss of contrast ratio is caused by light leaking through the black state pixel elements at large viewing angles. In color displays, such leakage is also known to cause severe color shifts for both saturated and grayscale colors.

2.1. Single Tilt Domain Liquid Crystal Display

The viewing zone of acceptable grayscale stability in a typical prior art twisted nematic liquid crystal display is severely limited because, in addition to color shifts caused by dark state leakage, the optical anisotropy of the liquid crystal molecules results in large variations in gray level transmission, i.e., a shift in the display's brightness-voltage curve, as a function of viewing angle. The variation is often severe enough that, at extreme vertical angles, some of the gray levels reverse their transmission levels. These limitations are particularly important for applications requiring a very high quality display, such as for use in avionics, where viewing of cockpit displays from both pilot and copilot seating positions is important. Such high information content displays require that the display's relative gray level transmission be as invariant as possible with respect to viewing angle. It would be a significant improvement in the art to provide a liquid crystal display capable of presenting a high quality, high contrast image over a wide field of view.

As shown in FIG. 1, a conventional full color single tilt domain display 100 comprises a polarizer 105, an analyzer 110, a liquid crystal cell 115, and possibly one or more compensator layers 120. The liquid crystal cell 115 further comprises an active matrix substrate 125, a color matrix substrate 130, and liquid crystal material 135. (A polarizer 105 and an analyzer 110 both polarize electromagnetic fields. Typically, however, the term 'polarizer' refers to a polarizer element that is closest to the display's source of light while the term 'analyzer' refers to a polarizer element that is closest to the display's viewer.)

Ordinarily, the active matrix substrate 125 has deposited on it an array of thin-film transistors, transparent electrodes, address lines, and an alignment layer. Furthermore, the color matrix substrate 130 often has deposited on it a black matrix coating, a color filter matrix, a transparent electrode, and an alignment layer. The alignment layers on the active matrix substrate layer 125 and color matrix substrate layer 130 act in combination to induce a twisted nematic orientation to the liquid crystal material 135. Elements comprising the active matrix substrate layer 125 and color matrix substrate layer 130 are well-known and not shown in FIG. 1.

2.2. Dual Domain Liquid Crystal Display

One method of improving the grayscale linearity characteristics of a conventional liquid crystal display (LCD) is to implement a multi-domain LCD architecture. The basic structure of a dual-domain LCD is quite similar to that of the display shown in FIG. 1, with some significant differences as illustrated in FIG. 2. As shown, a collection of nematic molecules 200 are disposed between a pair of substrates 205 and 210. One substrate 205 has two rubbing directions, 215 11 and 220. The other substrate 210 also has two rubbing directions, 225 and 230. Rubbing direction 215 is opposite in sense to rubbing direction 220. Likewise, rubbing direction 225 (in a direction into the plane of FIG. 2) is opposite in sense to rubbing direction 230 (in a direction out of the plane of FIG. 2). Rubbing directions 215 and 220 are arranged at approximately 90° angles to rubbing directions 225 and 230 respectively. This type of rubbing produces two tilt domains 235 and 240 within the liquid crystal layer—hence the term "dual-domain" architecture.

A conventional dual-domain LCD further comprises a polarizer 245, an analyzer 250, and possibly one or more compensator layers 255 disposed between the polarizer and analyzer. Other methods have also been reported to generate two-domain structures, e.g., Koike et al. ("Late-News Paper: A Full-Color TFT-LCD With a Domain-Divided Twisted-Nematic Structure," SID 92 Digest, pp. 798–801, 1992) and Takatori et al. ("A Complementary TN LCD with Wide-Viewing-Angle Grayscale," Proceedings 12th Int. Display Res. Conf.—Japan Display 92, pp. 591–594, 1992).

One function of a dual-domain display is to average the gray level behavior of the display over the display's positive and negative vertical viewing directions. Such averaging is known to produce improved gray level linearity.

Increasing the display's contrast over the vertical field of view requires compensation that is effective for both positive and negative viewing directions. Further, even the improved gray level linearity produced by a basic dual-domain architecture is not sufficient for many applications, e.g., avionics and large workstation displays. See, for example, Yang, "Two-Domain Twisted Nematic and Tilted Homeotropic Liquid Crystal Displays for Active Matrix Applications," Record 1991 Int. Display Res. Conf., San Diego, Calif., pp. 68–72, 1991.

2.3. O-Plate Compensation

Commonly owned, U.S. Pat. No. 5,504,603 describes a novel compensator structure incorporating an obliquely-oriented, positively birefringent compensator (phase retardation) element referred to as an O-plate compensator. The O-plate compensator structure significantly improves gray level linearity and provides high contrast over large variations in viewing direction for single-domain twisted-nematic LCD architectures. Additional embodiments allow for the use of a negatively birefringent O-plate compensator.

The optical axis (i.e., the major axis of the refractive index ellipsoid) of an O-plate compensator has a fixed orientation relative to the average orientation of the liquid crystal director near the central region of the liquid crystal cell in its partially-driven state. This orientation requirement makes use of prior O-plate compensator techniques incompatible with a dual-domain liquid crystal display architecture because the orientation of the liquid crystal director is different in the two domains.

For an O-plate compensator to be effective, the alignment of its optical axis must have a fixed relation to the liquid crystal director orientation. This requirement results in the need to "pixelate" the O-plate compensator element. That is, the orientation of the O-plate within each pixel must vary between the different tilt domains. Thus, for a dual-domain LCD employing O-plate compensation, the O-plate must be spatially patterned into two separate areas having two different orientations with the pattern coinciding with that of the alternating tilt domains.

Further, because of a display's small pixel size (typically less than 150 micrometers, $\mu$m) relative to the thickness of the liquid crystal cell's substrate (typically 1.1 millimeter, mm), it is necessary to fabricate the pixelated O-plate compensator on an interior surface of the liquid crystal cell's substrate. If the pixelated O-plate were applied external to the liquid crystal cell, severe parallax problems would result. Thus, if O-plate technology is used in a dual-domain LCD, it is necessary to place at least the O-plate components and possibly other compensator components inside the liquid crystal cell.

2.4. Pixelated Compensator Architectures

More generally, a pixelated dual-domain liquid crystal display might include combinations of components such as shown in Table 1 below. Table 1 is a partial list of useful pixelated compensator configurations. In each example, the liquid crystal layer (LC) is presented as two sections having different tilt domain orientations as designated by arrows. Compensators that are internal to the liquid crystal cell and pixelated are printed on the same line as their corresponding tilt domain and designated as different valued using subscripts and by orientation using arrows. Components that are not pixelated are shown as having identical subscripts and/or orientations for both tilt domains. Here, A represents an A-plate, C represents a C-plate, O represents an O-plate, and P represents a polarizer (representing either an analyzer or polarizer). As would be apparent to those of ordinary skill having the benefit of this disclosure, pixelated components can be placed on either side of the liquid crystal layer, depending on the design parameters a designer is attempting to optimize. An A-plate is a compensator element whose optical axis is oriented substantially in the plane of the plate. A C-plate compensator element has its optical axis oriented substantially normal to the plane of the plate. As for O-plate compensator elements, A-plates and C-plates may have either positive or negative birefringence. The embodiments described on Table 1 represent configurations utilizing positively birefringent O-plates and A-plates, and negatively birefringent C-plates.

TABLE 1

Pixelated Liquid Crystal Display Elements

| ← Toward Rear (Polarizer Side) | | | | Toward Front (Analyzer Side) → | |
|---|---|---|---|---|---|
| - external to LC cell - | | - internal to LC cell - | | - external to LC cell - | |
| P | | LC↑ | $A_1$ $O_1$↑ | $A_2$ | P |
| | | LC↓ | $A_1$ $O_2$↓ | | |
| P | | LC↑ | $C_1$ $A_1$ $O_1$↑ | $A_2$ | P |
| | | LC↓ | $C_1$ $A_1$ $O_2$↓ | | |
| P | $C_1$ | LC↑ | $C_2$ $A_1$ $O_1$↑ | $A_2$ | P |
| | | LC↓ | $C_2$ $A_1$ $O_2$↓ | | |
| P | $A_1$ | LC↑ | $A_2$ $O_1$↑ | P | |
| | | LC↓ | $A_2$ $O_2$↓ | | |
| P | $C_1$ | LC↑ | $A_1$ $O_1$↑ | P | |
| | | LC↓ | $A_1$ $O_2$↓ | | |
| P | $C_1$ | LC↑ | $A_1$ | P | |
| | | LC↓ | $C_2$ $A_2$ | | |
| P | | LC↑ | $A_1$ $O_1$↑ | $A_3$ | P |
| | | LC↓ | $A_2$ $O_2$↓ | | |
| P | $C_1$ | LC↑ | | P | |
| | | LC↓ | $C_2$ | | |

SUMMARY OF THE INVENTION

A method of fabricating a photo-patterned organic compensator for liquid crystal displays, and the resulting compensator structure, are described. A method in accordance with the invention comprises: (1) depositing a thin film of polymerizable liquid crystal material onto one of a display's substrates; (2) orienting the liquid crystal material's director to a specified direction; (3) polymerizing the deposited thin film by employing ultraviolet illumination through an aperture mask; (4) removing the aperture mask; and (5) curing/annealing the thin film layer to yield a planar structure having substantially birefringent and isotropic regions. Complete pixelated compensators may be created by layering two or more such two-region thin films.

BRIEF DESCRIPTION OF DRAWINGS

FIG. 6 illustrates a laptop computer incorporating a liquid crystal display.

DETAILED DESCRIPTION OF A SPECIFIC EMBODIMENT

In the interest of clarity, not all features of an actual implementation are described in this specification. It will of course be appreciated that in the development of any such actual implementation, numerous implementation-specific decisions must be made to achieve the developers' specific goals such as compliance with system-related and business-related constraints and that these goals will vary from one implementation to another. Moreover, it will be appreciated that such a development effort might be complex and time-consuming, but would nevertheless be a routine undertaking of device engineering for those of ordinary skill having the benefit of this disclosure.

5.1. Fabrication of a Photo-Patterned Compensator

Figure 3:
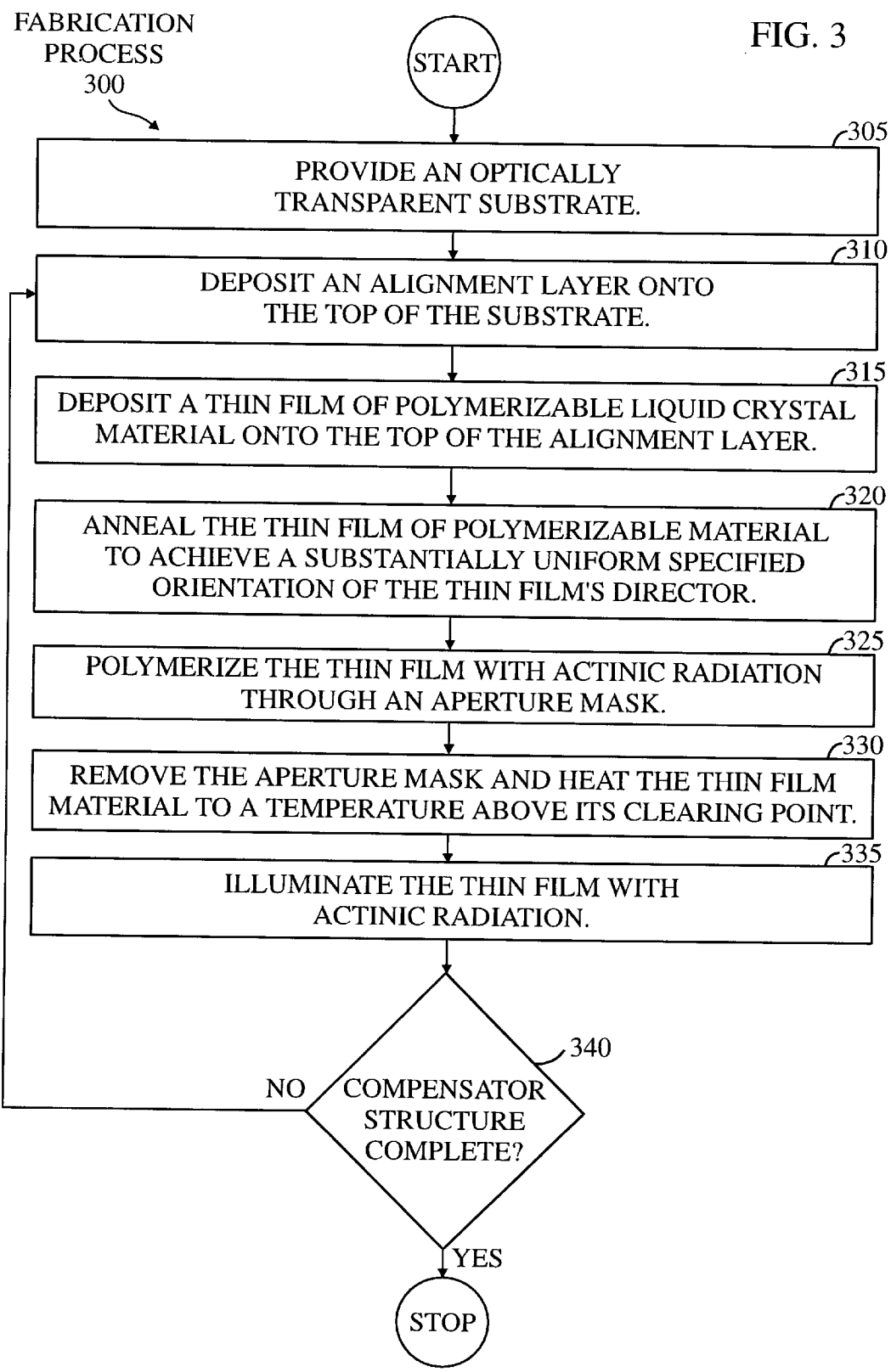
FIG. 3 is a high-level flow chart showing one exemplar process for fabricating a photo-patterned (pixelated) compensator in accordance with the invention.

FIG. 3 is a flow chart 300 showing one exemplar process for fabricating a photo-patterned (pixelated) compensator in accordance with the invention. Block numbers below refer to blocks in FIG. 3.

305: Provide an optically transparent substrate. The substrate can be either glass or plastic and may be either, or both, of the plates that form the display's liquid crystal cell. Conventional active matrix LCDs are typically designed with their active matrix substrate on the light source side of the display unit and the color matrix substrate on the viewer side of the display unit. In one embodiment, a photo-patterned compensator is placed on the interior side (e.g., toward the liquid crystal material) of the color filter substrate.

310: Generate a surface that will induce liquid crystal alignment. This may be done by first depositing a film of a suitable alignment material onto the substrate surface. Conventional alignment layer materials include, for example, polyimide materials that have been physically rubbed. As would be known to those of ordinary skill in the art, rubbing or buffing of a polyimide alignment layer induces a pretilt angle for the subsequently formed polymerizable liquid crystal thin film (see operation 315). It is noted that low, or zero, pretilt angles may be required for the formation of A-plate compensators.

In this specification, the term "deposit" encompasses any convenient technique in which a layer is formed in-place and is intended to distinguish from other techniques such as lamination, in which a pre-formed layer is bonded to a substrate. Specifically, the term "deposit" is not intended to be limited to depositing a material directly onto a substrate, but instead to encompass situations in which a material is deposited onto one or more intermediate layers which are on a substrate.

In one embodiment, the alignment layer is solvent cast onto the substrate. In this wellknown process, the alignment layer material is first dissolved by a solvent to form a solution, which is then applied to the surface of the substrate. When the solvent is evaporated off, what remains is an alignment layer. For example, an alignment layer of JALS246 polyimide may be applied at room temperature and baked at a temperature of between 100° C. and 200° C. for 5 to 60 minutes to remove the solvent to produce an alignment layer of approximately 0.1 to 0.3 $\mu$m in thickness.

Commercially available solvents include aromatic hydrocarbons such as toluene and monochlorobenzene, ketones such as methylethylketone and cyclohexanone, and esters such as perhaps propyleneglycolmonomethyletheracetate (PGMEA). Some other techniques which are compatible with the inventive method include spin-coating, Meier-rod or doctor-bar coating, and meniscus coating.

Alternative methods for inducing liquid crystal alignment, such as the use of optically induced alignment on certain polyimide materials, or other suitable materials, can also be employed.

315: Deposit a thin film of polymerizable liquid crystal material onto the alignment layer. Polymerizable liquid crystal materials suitable for use include, for example, materials such as RM82 and RM257 (available from E.M. Industries), which form a nematic liquid crystal phase having positive birefringence. These materials are typically combined with a suitable photoinitiator material [for example, a mixture of 30% ITX (Pfalz and Bauer) and 70% EDAB (Aldrich Chemical)] at a concentration of about 1%. In one embodiment, the polymerizable liquid crystal material is solvent cast onto the alignment layer of operation 315 and has a thickness, after drying, of approximately 1.0 micrometer ($\mu$m).

320: Anneal the polymerizable liquid crystal material to obtain a uniform specified orientation of the liquid crystal material's director. Those of ordinary skill in the field will recognize that the temperature required to provide a specific director orientation at the thin film's air interface (as distinguished from the thin film-alignment layer interface) is dependent upon the type of thin film material used. To fabricate an O-plate or A-plate using nematic material, for instance, the temperature is adjusted to place the thin film material into its nematic phase (typically between 80° C. to 100° C.). In general, given a liquid crystal material having an isotropic clearing temperature of $T_c$ and a crystalline-to-nematic transition temperature of $T_n$, the temperature would be adjusted to between $T_c$, and $T_n$. For example, the temperature may be adjusted to 90° C. to obtain a director tilt angle of 50° (measured relative to the perpendicular of the film's surface). Orientation of the liquid crystal material into a single defect-free domain will typically occur within several seconds to several minutes of film drying at the appropriate annealing temperature.

325: Polymerize the thin film material by illuminating it with ultraviolet radiation through an aperture mask, where the pattern of apertures corresponds to a selected set of liquid crystal domains within a display pixel. The aperture mask could, for example, be a conventional photolithographic mask. An important aspect of the aperture mask is that it partitions the thin film of polymerizable liquid crystal material into two types of regions: polymerized (those regions receiving illumination during operation 335, see below) and unpolymerized (those regions not receiving illumination during operation 335, see below). An approximately 1 micrometer thick film of RM257 with 1% ITX:EDAB photoinitiator can be cured using ultraviolet illumination in the 355–405 nm range of wavelengths at an energy density of 0.3 to 1.0 J/cm$^2$.

Remove the aperture mask and heat the thin film to a temperature above its clearing point, $T_c$. This operation affects the unpolymerized regions of the thin film by making them substantially isotropic.

335: Illuminate the thin film of liquid crystal material with ultraviolet radiation so as to polymerize the previously unpolymerized regions of the thin film. In this operation the ultraviolet radiation cures those regions made isotropic in operation 330. The film can be cured using similar conditions as described in step 325 above.

At the completion of operation 335, a thin film of liquid crystal material having a planar structure with birefringent regions (those regions polymerized in operation 325) corresponding to selected (via the aperture mask) liquid crystal domain orientations and isotropic regions (those regions cured in step 330) corresponding to non-selected (via the aperture mask) liquid crystal domains has been created.

340: Operations 310 through 335 are repeated as necessary to fabricate a desired compensator. Specifically, a complete compensator may be comprised of sequentially layered thin films created in accordance with steps 310 through 335. For example, if a dual-domain O-plate compensator is desired, operations 310 through 335 would be repeated twice: the first pass through operations 310 through 335 produce a layer having polymerized regions corresponding to the first of the display's two domains, and the second pass through operations 310 through 335 produce a layer having polymerized regions corresponding to the second of the display's two domains.

While a photo-patterned compensator in accordance with the invention may be formed from a plurality of thin film layers, the total reactive liquid crystal material thickness is typically between approximately 1.0 µm and 3.0 µm.

If subsequent compensators such as, for example, an A-plate were added, operations 310 through 335 would be repeated for each domain in the compensator. As noted before, additional compensators such as an A-plate(s) or C-plate(s), could be placed outside the liquid crystal cell. These compensator (phase retardation) elements would not normally be pixelated. It should be noted that should the two liquid crystal display domains be such that their relative alignment angles are not oriented at 180 to each other, then any A-plate compensator layer may be required to be positioned within the liquid crystal cell and pixelated.

Figure 4:
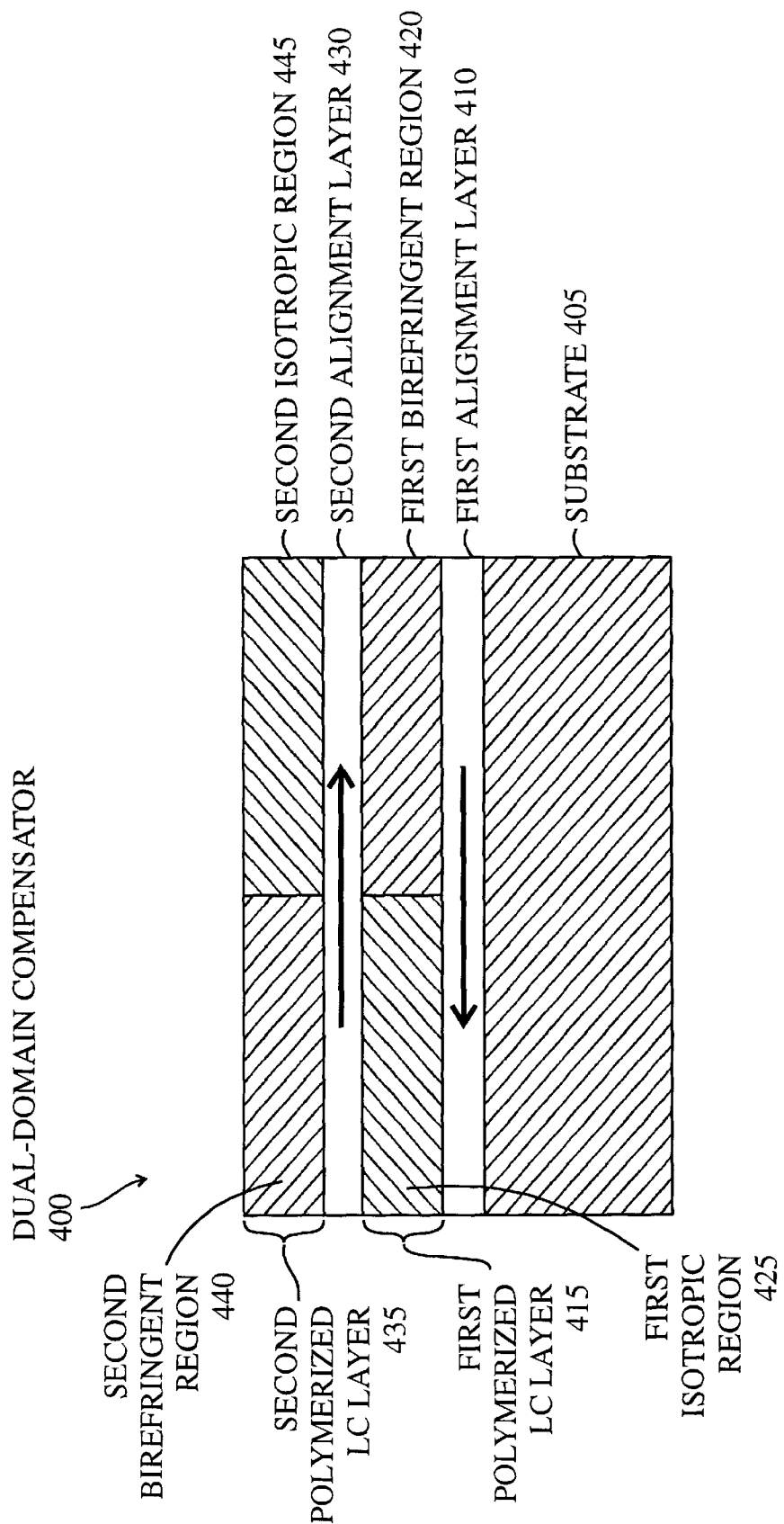
FIG. 4 illustrates the structure of a dual-domain photo-patterned compensator in accordance with the method of FIG. 3.

FIG. 4 shows a dual-domain photo-patterned compensator structure 400 fabricated in accordance with operations 305–340. As illustrated, an optically transparent substrate 405 has deposited on it a first alignment layer 410 with a first alignment direction as indicated by the left-going arrow. On top of the alignment layer 405, a first thin film of polymerizable liquid crystal material 415 is deposited. When the first thin film 415 is illuminated with ultraviolet radiation through a first aperture mask, two regions are created. That region of the first thin film 415 exposed to ultraviolet radiation is polymerized, creating a first birefringent region 420. That region not exposed to ultraviolet radiation creates a first isotropic region 425.

Next, a second alignment layer 430 is deposited which has an alignment direction substantially opposite that of the first alignment layer's 410 (for a dual-domain compensator). A second thin film 435 of polymerizable liquid crystal material is deposited. A second aperture mask is used to partition the compensator into regions. That region above the first birefringent region 420 is shielded by the second aperture mask and That region above the first isotropic region 415 is exposed by the second aperture mask. Exposure of the composite structure to ultraviolet radiation creates a second birefringent region 440 and a second isotropic region 445. The resulting structure 400 creates a dual-domain compensator for each pixel of the display.

Figure 1:
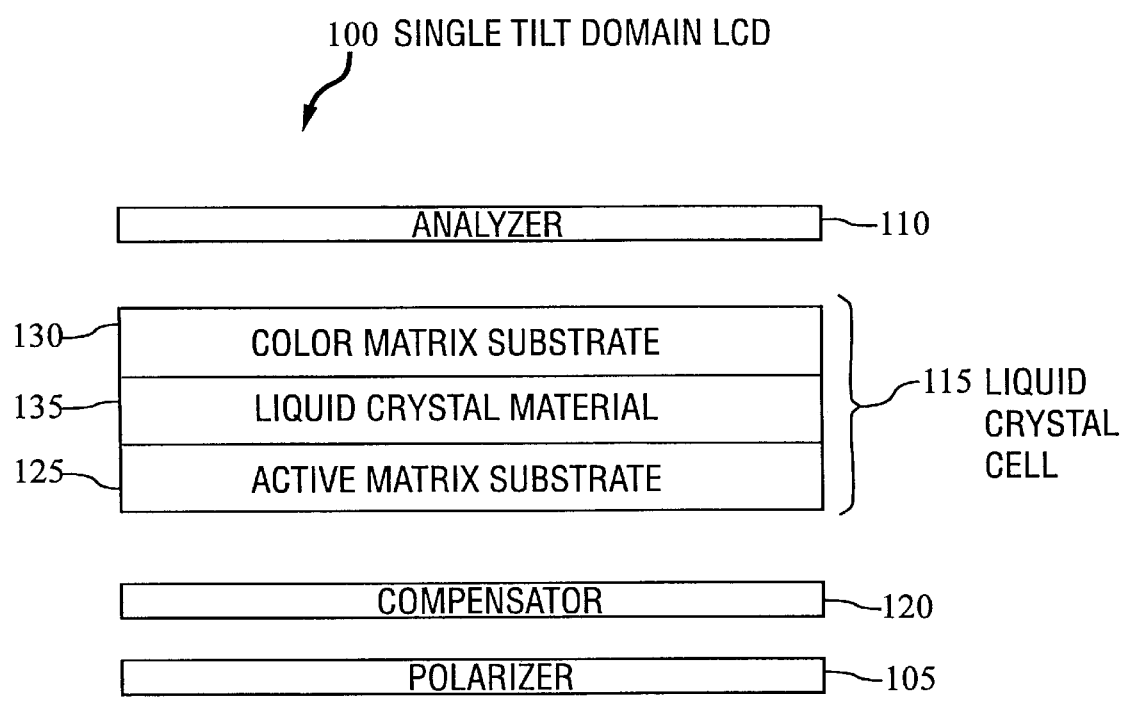
FIG. 1 is a cross-sectional view of a single-domain liquid crystal display.
Figure 2:
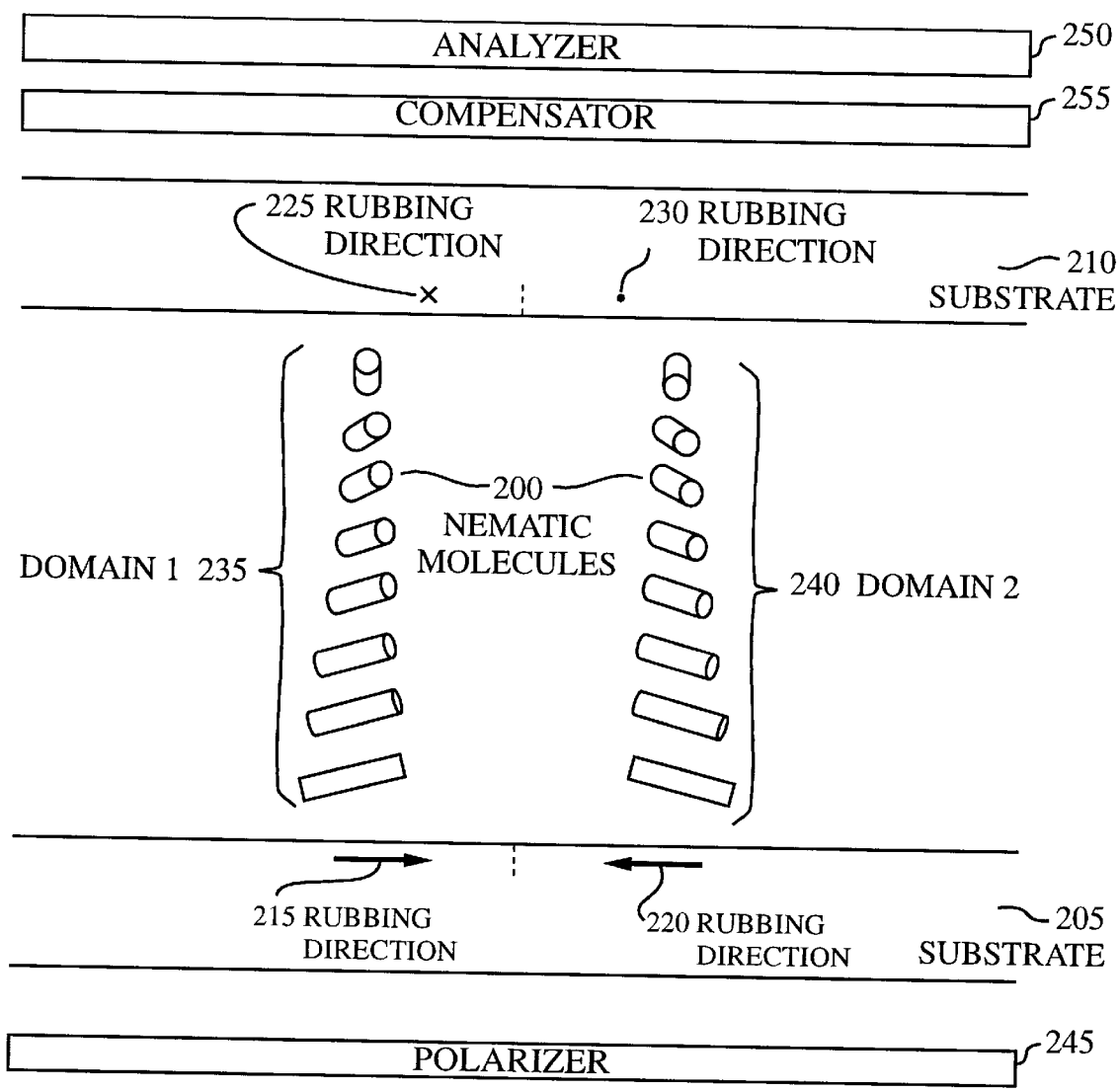
FIG. 2 is a cross-sectional view of a dual-domain twisted nematic liquid crystal display.
Figure 5:
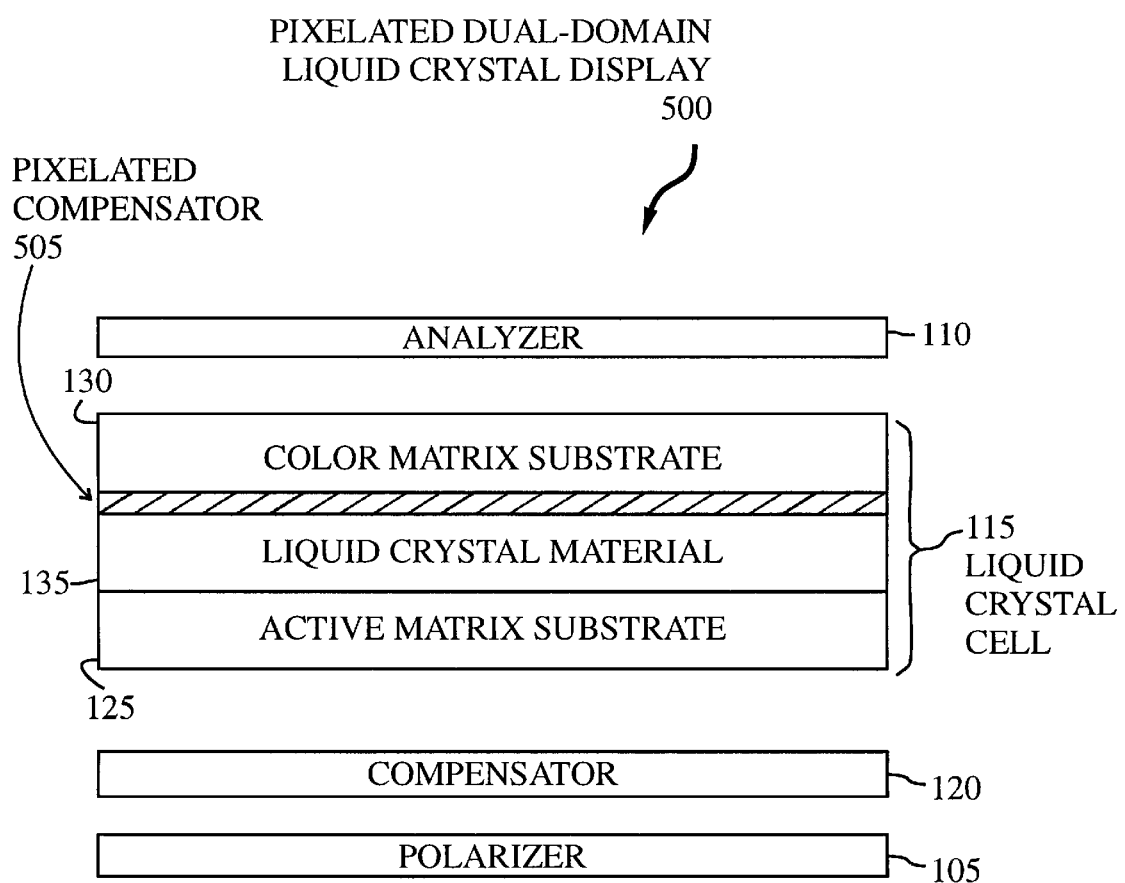
FIG. 5 shows a color, active matrix, liquid crystal display incorporating a dual-domain photo-patterned compensator in accordance with the invention.

FIG. 5 shows a color active matrix liquid crystal display 500 that incorporates a dual-domain compensator (phase retardation) 505 in accordance with the invention. As described in the context of FIG. 1, compensator element 120 could be a A-Plate, C-plate, or O-plate compensator and could, furthermore, be situated on either side of the liquid crystal cell 115 depending upon the specific design goals of the display 505.

5.2. A Computer System Using the Photo-patterned Compensator FIG. 6 illustrates a lap top computer 600 which contains an input unit 605, a microprocessor 610, and a liquid crystal display (LCD) 500. Though a keyboard is illustrated as the input unit 605, other input units can include a mouse, trackball, or numeric key pad. The microprocessor 610 may be any general purpose microprocessor such as an Intel x86 compatible microprocessor, a Motorola Power PC microprocessor, a DEC Alpha microprocessor, or an IMPS microprocessor. The LCD 500 which was illustrated in FIG. 5 may be used as a display in the laptop computer 600.

5.3. Comments

One major benefit of fabricating a liquid crystal display (LCD) in accordance with the invention is that it provides an expanded range of viewing angles having high contrast and stabilized grayscale performance as compared to prior art techniques. For instance, the dual domain configuration separately provides improved grayscale stability and a symmetric, but limited, vertical viewing range. An LCD incorporating a photo-patterned compensator as described herein can expand the range of viewing angles beyond that achievable using compensation alone on either a standard single- or dual-domain display.

It has been found empirically that liquid crystal displays incorporating compensators fabricated in accordance with the invention allow the use of lower display drive voltages. This benefit can reduce a display's power requirements which, in turn, can also reduce the display unit's cooling requirements and extend the display's battery life (if the display is a battery powered display).

The planar compensator structure fabricated in accordance with the invention, and as illustrated in FIG. 4 and 5, is constructed using an inherently simple process requiring few process steps. The method of FIG. 3 also minimizes any additional difficulties in subsequent fabrication of color filters, electrode structures, and other design features whose fabrication can benefit from the planar substrate comprising the compensator.

It will be appreciated by those of ordinary skill having the benefit of this disclosure that numerous variations from the foregoing illustration will be possible without departing from the inventive concept described herein. Accordingly, it is the claims set forth below, and not merely the foregoing illustration, which are intended to define the exclusive rights claimed in this application program.

What is claimed is:

1. A method of manufacturing a photo-patterned optical compensator for a liquid crystal display comprising:
    (a) applying a liquid crystal alignment layer to a substrate,
    (b) applying a thin film of a polymerizable liquid crystal material, referred to as a thin film, to the liquid crystal alignment layer;
    (c) heating the thin film to obtain a uniform specified orientation of a director of said thin film;
    (d) illuminating the thin film with ultraviolet radiation through a first photolithographic aperture mask having a pattern of apertures corresponding to a selected set of liquid crystal domains within a display pixel, the illumination creating regions of substantially polymerized thin film material and regions of substantially unpolymerized thin film material, said substantially polymerized regions corresponding to the aperture mask's apertures;
    (e) annealing the thin film; and
    (f) illuminating the thin film with ultraviolet radiation to substantially polymerize any previously unpolymerized regions of the thin film.

2. The method of claim 1 wherein said photo-patterned optical compensator is selected from the group consisting of an O-plate compensator and an A-plate compensator.

3. The method of claim 1 wherein said substrate is selected from the group consisting of glass and plastic.

4. The method of claim 1 wherein said alignment layer is a rubbed polyimide alignment layer.

5. The method of claim 1 wherein said applying operations of paragraph (a) and paragraph (b) comprise solvent casting.

6. The method of claim 1 wherein said ultraviolet light has a wavelength in the range of 355 to 405 nm.

7. The method of claim 1 wherein the operations recited in paragraphs (a) through (f) are repeated as necessary to create a multi-layer photo-patterned optical compensator comprising alternating layers of (1) a liquid crystal alignment layer material and (2) a photopatterned liquid crystal thin film material.

8. The method of claim 7 wherein the operations recited in paragraphs (a) through (f) are performed twice to create a dual-domain photo-patterned optical compensator.

9. A method of fabricating a photo-patterned optical compensator comprising:

(a) providing a substrate;

(b) applying a liquid crystal alignment layer to the substrate;

(c) applying a thin film of a polymerizable liquid crystal material to the alignment layer;

(d) heating the thin film to obtain a uniform specified orientation of a director of the thin film;

(e) illuminating the thin film with ultraviolet radiation through an aperture mask having a pattern of apertures corresponding to a selected set of liquid crystal domains, the illumination creating regions of polymerized thin film material and regions of unpolymerized thin film material, said polymerized regions corresponding to the aperture mask's apertures;

(f) annealing the thin film; and (g) illuminating the thin film with ultraviolet radiation to substantially polymerize any previously unpolymerized regions of said first thin film.

10. The method of claim 9 wherein the photo-patterned optical compensator is selected from the group consisting of an O-plate compensator and an A-plate compensator.

11. The method of claim 9 wherein the substrate is selected from the group consisting of glass and plastic.

12. The method of claim 9 wherein the alignment layer is a rubbed polyimide alignment layer.

13. The method of claim 9 wherein said applying operation of paragraph (b) and paragraph (c) comprise solvent casting.

14. The method of claim 9 wherein said ultraviolet light has a wavelength in the range of 355 to 405 nm.

15. The method of claim 9 wherein the aperture mask is a photolithographic aperture mask.

16. The method of claim 9 wherein the operations recited in paragraphs (b) through (g) are repeated as necessary to create a multi-layer photo-patterned optical compensator comprising alternating layers of (1) a liquid crystal alignment layer and (2) a photo-patterned liquid crystal thin film material.

17. The method of claim 16 wherein the operations recited in paragraphs (b) through (g) are performed twice to create a dual-domain photo-patterned optical compensator.

18. A photo-patterned optical compensator layer comprising:

(a) a liquid crystal alignment layer formed on a first surface of a substrate;

(b) a thin film of polymerizable liquid crystal material formed on a first surface of the alignment layer, the thin film being (1) heated to obtain a uniform specified orientation of a director of the thin film, then (2) illuminated with ultraviolet radiation through an aperture mask having a pattern of apertures corresponding to a selected set of liquid crystal domains, the illumination creating regions of polymerized thin film material and regions of unpolymerized thin film material, said polymerized regions corresponding to the aperture mask's apertures, then (3) annealed, and then (4) illuminated again to substantially polymerize any previously unpolymerized regions of said thin film, such that said thin film is provided with a plurality of regions wherein said regions corresponding to the aperture mask's apertures are optically birefringent and said previously unpolymerized regions are optically isotropic.

19. A dual-domain photo-patterned optical compensator comprising two photo-patterned optical compensator layers in accordance with claim 18.

20. A photo-patterned optical compensator comprising a plurality of photo-patterned optical compensator layers in accordance with claim 18.

21. The photo-patterned optical compensator of claim 20 wherein said photo-patterned optical compensator is an O-plate compensator.

22. The photo-patterned optical compensator of claim 20 wherein said photo-patterned optical compensator is an A-plate compensator.

23. A photo-patterned optical compensator comprising a plurality of layers of polymerizable liquid crystal material thin films, each one of said plurality of thin films having a plurality of regions wherein some of said plurality of regions are optically birefringent and some other of said plurality of regions are optically isotropic, said photo-patterned compensator applied to an interior surface of a liquid crystal cell.

24. The photo-patterned optical compensator of claim 23 wherein said photo-patterned optical compensator is an O-plate compensator.

25. The photo-patterned optical compensator of claim 23 wherein said photo-patterned optical compensator is an A-plate compensator.

26. A computer comprising:

(a) a processor;

(b) an input device; and (c) a liquid crystal display including a photo-patterned optical compensator in accordance with a specified one of claims 18 through 25.

\* \* \* \* \*